(12) United States Patent
Mejia et al.

(10) Patent No.: US 6,700,547 B2
(45) Date of Patent: Mar. 2, 2004

(54) MULTIDIRECTIONAL WALKTHROUGH ANTENNA

(75) Inventors: Ezequiel Mejia, Woodbury, MN (US); Yuri Smirnov, Eagan, MN (US)

(73) Assignee: Digital Angel Corporation, South St. Paul, MN (US)

( * ) Notice: Subject to any disclaimer, the term of this patent is extended or adjusted under 35 U.S.C. 154(b) by 0 days.

(21) Appl. No.: 10/121,849

(22) Filed: Apr. 12, 2002

(65) Prior Publication Data

US 2003/0193445 A1 Oct. 16, 2003

(51) Int. Cl.[7] ................................................. A01K 5/02
(52) U.S. Cl. ...................... 343/743; 119/155; 119/51.02
(58) Field of Search ................................. 343/742, 895, 343/872; 119/51.02, 719, 720, 908, 155, 51 R; 340/572

(56) References Cited

U.S. PATENT DOCUMENTS

| | | | |
|---|---|---|---|
| 2,304,446 A | 12/1942 | Eaton ........................... | 250/11 |
| 2,485,675 A | 10/1949 | Taylor et al. ................ | 343/114 |
| 3,689,885 A | 9/1972 | Kaplan et al. ............ | 340/152 T |
| 4,065,753 A | 12/1977 | Paul, Jr. ....................... | 340/152 |
| 4,262,632 A | 4/1981 | Hanton et al. .................. | 119/1 |
| 4,388,730 A | 6/1983 | Nash et al. .................. | 455/208 |
| 4,510,495 A | 4/1985 | Sigrimis et al. ........ | 340/825.54 |
| 4,617,876 A | 10/1986 | Hayes .......................... | 119/155 |
| 4,730,188 A | 3/1988 | Milheiser ..................... | 340/825 |
| 4,798,175 A * | 1/1989 | Townsend et al. .......... | 119/155 |
| 5,041,826 A | 8/1991 | Milheiser ............... | 340/825.54 |
| 5,211,129 A | 5/1993 | Taylor et al. .................. | 119/3 |
| 5,574,470 A * | 11/1996 | de Vall ........................ | 343/895 |
| 5,686,902 A | 11/1997 | Reis et al. ............. | 340/825.54 |
| 5,711,246 A * | 1/1998 | Yano et al. .............. | 119/51.02 |
| 5,923,300 A | 7/1999 | Mejia ......................... | 343/788 |
| 5,952,935 A | 9/1999 | Mejia et al. ........... | 340/825.54 |
| 6,000,361 A | 12/1999 | Pratt ....................... | 119/51.02 |
| 6,014,107 A | 1/2000 | Wiesenfarth ................. | 343/742 |
| 6,069,564 A | 5/2000 | Hatano et al. ........... | 340/572.7 |
| 6,166,637 A | 12/2000 | Cyr et al. ................. | 340/572.7 |
| 6,184,777 B1 | 2/2001 | Mejia ......................... | 340/101 |

\* cited by examiner

Primary Examiner—James Clinger
(74) Attorney, Agent, or Firm—Sheridan Ross P.C.

(57) ABSTRACT

A flexible interrogator antenna design having a single antenna with an inner and an outer antenna coil positioned in a flat, flexible, rectangular housing or mat which can be positioned in a configuration having two sides and a top across an easily erected temporary frame to form a walk-through corridor or chute through which livestock having an attached transponder can be driven. The antenna is driven to generate multi-directional electromagnetic fields in each of an 'X', 'Y' and 'Z' axis associated with the walkthrough to detect transponders coming into the fields, regardless of transponder orientation.

34 Claims, 7 Drawing Sheets

*(TOP VIEW)*

*(FRONT VIEW)*

(SIDE VIEW)

(FRONT VIEW)

(TOP VIEW)

(FRONT VIEW)

MULTIDIRECTIONAL WALKTHROUGH ANTENNA

FIELD OF THE INVENTION

This invention relates to wireless devices, and more particularly, to an antenna attached to a remote sensing apparatus or interrogator for use in detecting wireless communications devices such as radio frequency identification (RFID) tags or transponders affixed to livestock for identification of an animal as it passes proximate to the antenna.

BACKGROUND OF THE INVENTION

Wireless communications devices, including wireless memory devices for storing and transmitting data such as RFID transponders or tags are generally known in the art. Such transponders are particularly used in the livestock industry for such uses as tracking and accounting for animals being shipped and, for distinguishing between animals, such as upon introduction to a herd or feedlot. The devices are also useful in tracking, such as used in connection with salmon and other fish for scientific and environmental purposes.

However, difficulties have existed for some time with electronically reading identification tags mounted on livestock or fish. First, the transponder to be monitored is passive and is typically implanted within the fish or animals where the final position or orientation of the implanted transponder cannot be controlled. Alternatively, the transponder is externally affixed to an animal's ear, such as with livestock, and the orientation of the transponder varies with the movement of the animal's head. In this regard, to optimize reading of a transponder, the transponder antenna should be properly aligned with the fields generated by the interrogator antenna. Also, environmental conditions need to be considered that could adversely affect orientation of the transponder relative to the antenna, such as water currents in the case of fish, or rain, wind and sun in the case of outdoor livestock. Further, for optimum activation and communication, an adequate electromagnetic field must be generated by the interrogation device or interrogation antenna. Thus, weak magnetic interrogation fields and/or poorly orientated transponders can inhibit accurate interrogation of a transponder.

In the early prior art, these problems were addressed by utilizing a hand-held interrogator to read a transponder affixed to an animal. In this way, the reader could be positioned closely adjacent the animal to guarantee a sufficiently strong electromagnetic excitation field proximate the transponder. It also allowed the reader to be moved or swept over the animal to accommodate different transponder orientation. However, the cost in terms of wages and worker safety matters associated with dedicating a worker to the identification effort has provided motivation to attempt to automate the process. As a result, various types of automated identification devices have been developed.

More recently prior art interrogators for livestock identification have been directed to antenna arrangements rigidly mounted on a cattle gate or similar walkthrough. Such systems generally provide single or multiple antennas, typically placed on the sides, top and in some instances along the bottom of a walkthrough or chute in order to increase the area of magnetic field coverage for detecting a transponder tag attached to an animal.

These prior art systems present a problem in manufacturing, as well as transportation of the antenna, because of size and installation requirements. Such antennas are generally mounted inside panels for rigidity. Moreover, the panels may, in turn, be rigidly mounted in a larger structure, such as a walkthrough or chute to facilitate use with herds and other large groups of animals. However, because of the enclosed nature of the walkthroughs, the antenna structures or panels may present an obstacle and interfere with the cattle or other livestock passing through the walkthrough. Additionally, because of physical size and complexity, the walkthrough antennas are generally erected in a single or permanent location, typically in conjunction with a loading chute. As a result, the livestock must be brought to the interrogator rather than bringing the interrogator to where the animals are located. This can become a logistical and practical nightmare with large herds such as in feedlots where different groups are spread over large areas.

Nevertheless, the prior art antenna systems using such single or multiple antennas generally failed to provide full field coverage to accurately read the transponder information. As a result, prior art antenna arrangements may incorporate up to four loop antennas, arranged along the sides, top and the bottom of the walkthrough. However, even the use of up to four of the loop antennas often did not provide adequate coverage due to interference between the electromagnetic fields of the various loop antennas.

It would therefore be advantageous for an antenna to be developed which would alleviate the above-identified shortcomings of the prior art and otherwise improve the ability to accurately read transponders at varied orientations.

SUMMARY OF THE INVENTION

The present invention addresses the problems of the prior art in a flexible interrogator antenna design having a single antenna with an inner and an outer antenna coil positioned in a flexible, rectangular arrangement and providing multi-directional electromagnetic field generation capability.

In one embodiment, the antenna is disposed within a flexible mat or housing allowing it to be positioned in a configuration having two sides and a top, easily positioned across a temporary frame to form a walkthrough corridor or chute through which livestock having an attached transponder can be driven. When thus formed, a multi-directional field is generated within the walkthrough. In particular, the antenna of the present invention provides an electromagnetic field generally in each of three mutually perpendicular directions. For illustrative purposes, the three fields can be viewed as having an 'X', 'Y' and 'Z' axis, respectively, with the 'Z' axis along the direction of passage through the walkthrough.

The electromagnetic fields created by the outer antenna coil would normally be in phase. However, in bending the antenna to form the walkthrough, the fields generated by the outer coils in the side walls become out of phase, creating an electromagnetic field within the walkthrough along the 'Z' axis with a cancelling or null zone along the center. The effects of the null zone can be minimized by changing the size and shape of the coils to thereby move the null zone to different locations where it will have less effect given the relative location of the transponder as they traverse the passageway. The electromagnetic fields created by both antenna coils in the top portion are in phase and create fields along the 'Y' axis. The electromagnetic fields created by the inner coils in both side walls and the outer coil in the left sidewall with respect to the direction of passage create fields in the 'X' direction. Thus, as hereinafter described, the detection of a transponder passing through the walkthrough will be enhanced by the multidirectional electromagnetic fields of the antenna, no matter what the orientation of the transponder.

Thus, if the transponder passes through the walkthrough with its coil antenna oriented parallel to the ground, it will be optimally read by the electromagnetic field created in the 'Y' direction by the coils along the top of the walkthrough. If the transponder passes through the walkthrough with its coil antenna in a vertical/sideways orientation, it will be optimally read by the electromagnetic field created in the 'X' direction by the inner coils on both sides and the outer coil on the left side of the walkthrough. If the transponder passes through the walkthrough with its coil antenna in a vertical orientation, perpendicular to the 'Z' axis, it will be optimally read by the electromagnetic field created by the outer coils in both side walls of the walkthrough. No matter what the orientation is of the transponder antenna in passing through the walkthrough, the likelihood of it being successfully read will be enhanced by the above described multidirectional electromagnetic fields acting in concert. In fact, the multi-directional fields thus generated eliminate the need for an additional antenna in the floor of the walkthrough, simplifying manufacture and reducing cost.

The flexible design further allows for easy transportation of the antenna, as the flexible arrangement can be rolled up, readily transported to a desired site, e.g., where the animals are located, and then mounted on a simple and/or temporary frame at the site. The antenna can also be easily utilized in conjunction with existing loading chutes.

Accordingly, it is an object of the invention to provide an improved transponder interrogator antenna for use with a remote sensing apparatus and which has multi-directional electromagnetic field generation capability.

It is another object of the invention to provide an antenna capable of detecting a transponder irrespective of the orientation of the transponder passing through the electromagnetic fields generated by the antenna.

Still another object of the invention is to provide a flexible antenna having multi-directional electromagnetic field generation capability that is capable of being easily transported to a remote site, and installed on an existing loading chute or on a frame that can be readily erected at the remote site.

Other objects and features of the present invention will become apparent from the following detailed description in conjunction with the accompanying drawing figures. It is to be understood, however, that the drawings, which are not to scale, are designed solely for the purpose of illustration and not as definition of the limits of the invention, for which reference should be made to the appended claims.

BRIEF DESCRIPTION OF THE DRAWINGS

For a fuller understanding of the invention, reference is made to the following description taken in connection with accompanying drawings, in which:

FIG. 5b shows a top view of the electromagnetic field generated along the 'Z' axis shown in FIG. 5a;

FIG. 5c shows a front view of the electromagnetic field generated along the 'Z' axis shown in FIG. 5a;

FIG. 6b shows a side view of the electromagnetic field generated along the 'Y' axis shown in FIG. 6a;

FIG. 6c shows a front view of the electromagnetic field generated along the 'Y' axis shown in FIG. 6a;

FIG. 7b shows a top view of the electromagnetic field generated along the 'X' axis shown in FIG. 7a;

FIG. 7c shows a front view of the electromagnetic field generated along the 'X' axis shown in FIG. 7a.

Figure 1:
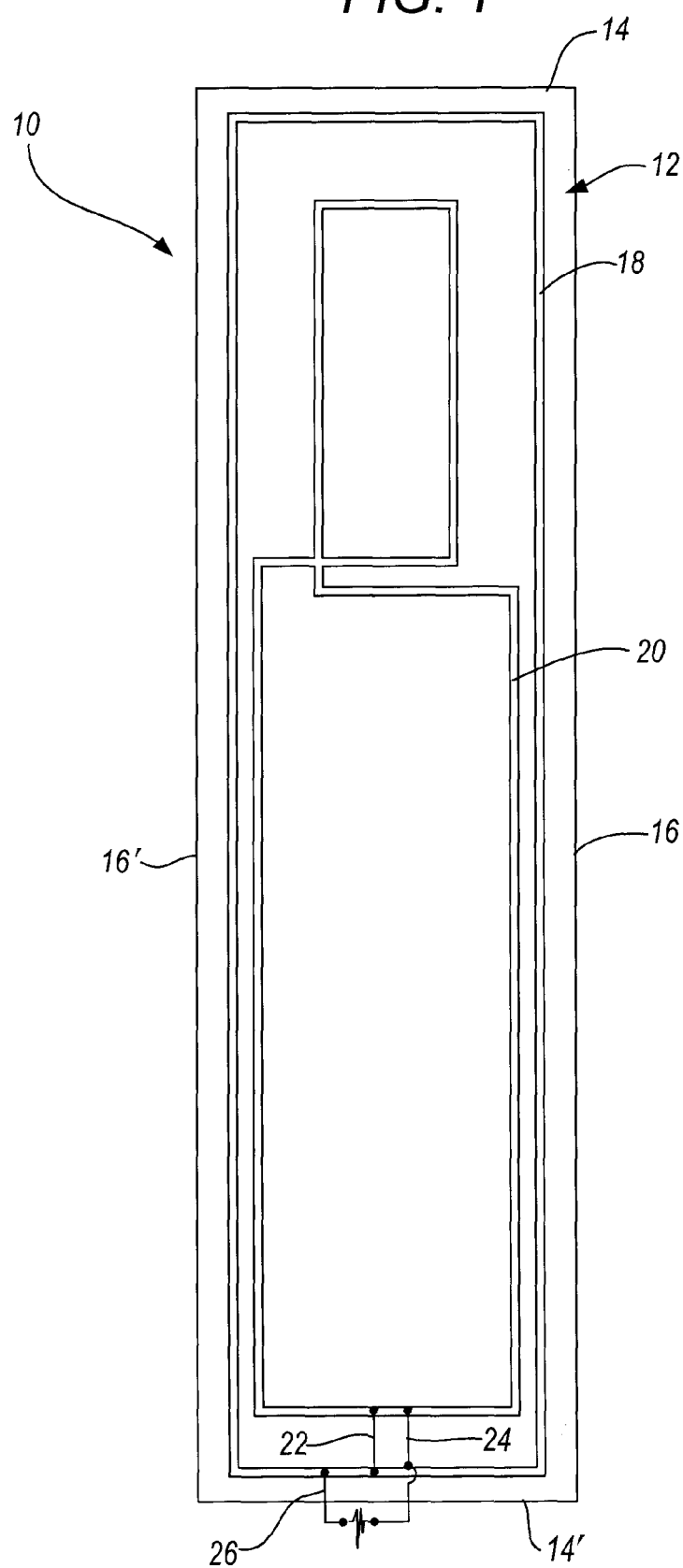
FIG. 1 is a top planar view of the antenna of the present invention showing the inner and outer antenna coils formed in the flexible housing.

It should be understood that the drawings are not necessarily to scale. For example, the lines representing the magnetic fields are for illustration purposes only, and are not intended to be a complete representation of the magnetic fields. In certain instances, details which are not necessary for an understanding of the invention or which render other details of the invention difficult to perceive may have been omitted. Also, it should be understood that the invention is not limited to the embodiment shown in the drawings.

DETAILED DESCRIPTION OF THE PREFERRED EMBODIMENT

The present invention is directed to an antenna for use with interrogators for reading transponders such as ear tags that are attached to livestock. More particularly, the invention is directed to an antenna that is easily transportable and deployable, and provides multidirectional electromagnetic fields capable of reading a transponder regardless of the orientation of the transponder as it moves through the electromagnetic field.

Referring now to FIG. 1, there is depicted a flexible, transportable antenna 10 in accordance with one embodiment of the present invention. Antenna 10 includes a relatively flat, flexible rectangular housing or mat 12, having short dimensions 14/14' and long dimensions 16/16'. In other embodiments, not shown, mat 12 may be in any geometric configuration which will provide the multidirectional electromagnetic field coverage described hereinafter, such as oval or square, which other embodiments are considered to be within the scope of the invention.

The fabric comprising the mat 12 should be selected to withstand extreme environments ranging from extremely hot with significant sun exposure, to bitter cold and wet or snowy. Therefore the fabric should be waterproof and tough, such as gore-tex, kevlar or even treated canvas. Moreover, given the proximity to numerous animals, the mat 12 should be capable of regular cleanings.

In still another embodiment (not shown), the antenna hereinafter described may be constructed of a rigid material for use with such as a fish run or the like where the transponder will be sampled in a single orientation. Further, as fish runs are usually placed along the predicted path the fish will travel, e.g., the migration path of salmon upstream in a river, the antenna installation for this embodiment may be of a semi-permanent nature.

As fish travel through a fish run generally in a single direction, so that the antenna coil of the transponder in each fish will generally be in the same orientation, the electromagnetic fields required for detection of the transponder will be those perpendicular to the antenna coil of the transponder.

The antenna 10 of the preferred embodiment includes an outer antenna coil 18 forming a first coil positioned within the housing or mat 12, and an inner antenna coil 20 forming a second coil positioned within the housing or mat 12 with inner coil 20 coupled to outer coil 18 via electrical connector 22. Outer coil 18 and inner coil 20 are coupled via electrical connectors 26, 24 respectively to a remote sensing unit/interrogator 25 (see FIG. 3) used to excite the antenna 10.

By way of example only and not by way of limitation, outer antenna coil 18 may consist of 4 coils of 16 or 18 gauge wire and inner antenna coil 20 may consist of 3 coils of the same gauge wire such that the inductance ('L') of the electromagnetic fields generated by the excited antenna is on the order of 200–300 µH. The actual wire gauge and length of wire forming the coil is relevant only in insuring a low 'Q', where $Q=X_L/R$ for each antenna coil, where maintaining the antenna 'Q' below 400 generally provides a broader resonance curve, increasing the transponder detection range.

Figure 2:
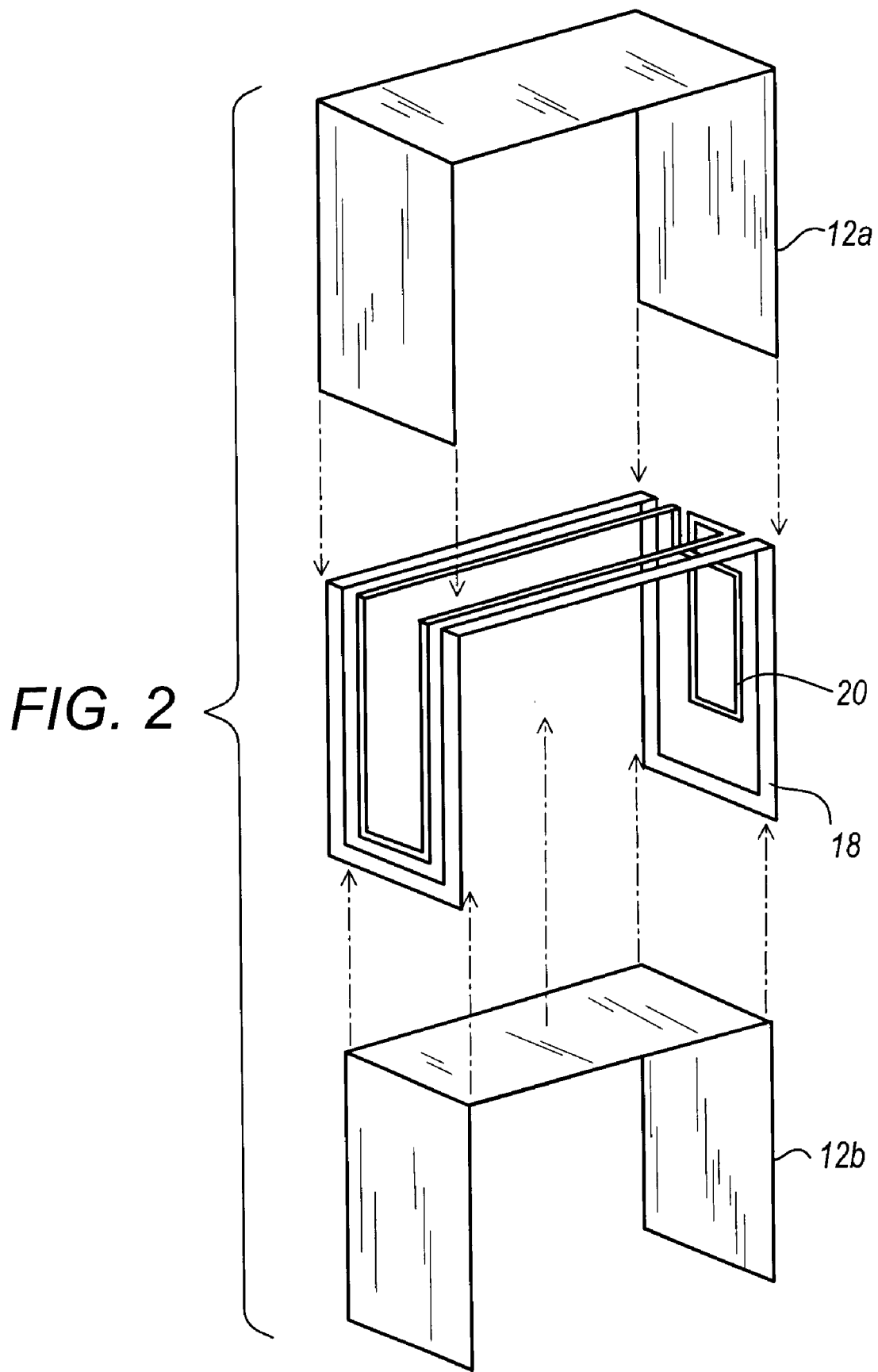
FIG. 2 is an isometric view of the flexible housing of the antenna folded to form a walkthrough passage through which the livestock to be identified may pass.

Referring now to FIG. 2, the housing may comprise two pieces of flexible material 12a, 12b, with the inner and outer antenna coils 18, 20 positioned there between. Thus, the antenna 10, including the housing 12 and antenna coils 18, 20 may be partially folded to form a passageway having a right side or wall 28 with respect to the direction of passage along the Z axis and formed by a short dimension 14 and a portion of long dimensions 16/16', a top or ceiling portion 32 formed by a portion of the long dimensions 16/16' and a left wall 30 with respect to passage formed by short dimension 14' and a portion of long dimensions 16/16'. In the preferred embodiment, the flexible material 12 is folded such that the dimensions of walls 28, 30 and top 32 along the long dimension 16, 16' are approximately equal. It should be understood that the actual dimensions may change depending upon the circumstances, such as use of this invention with different sized animals, such as horses, cattle, pigs, llamas, emus, etc. In such a case, the magnetic field distribution may not be at equilibrium, and the multidirectional capabilities of the antenna may be compromised. The compromise may be acceptable, however, if the location of the transponder does not vary significantly from animal to animal.

Figure 3:
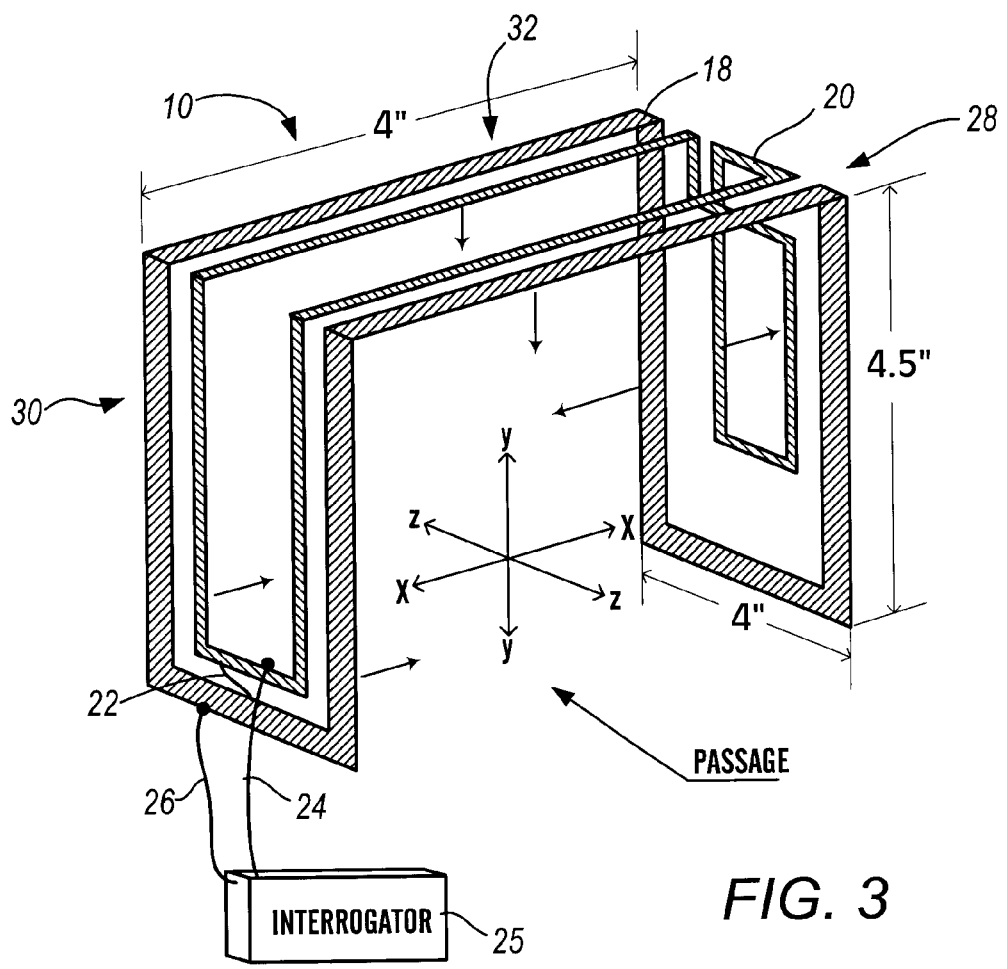
FIG. 3 shows the inner and outer coils of the antenna of the present invention in the folded position depicted in FIG. 2 and forming the walkthrough passage.
Figure 5A:
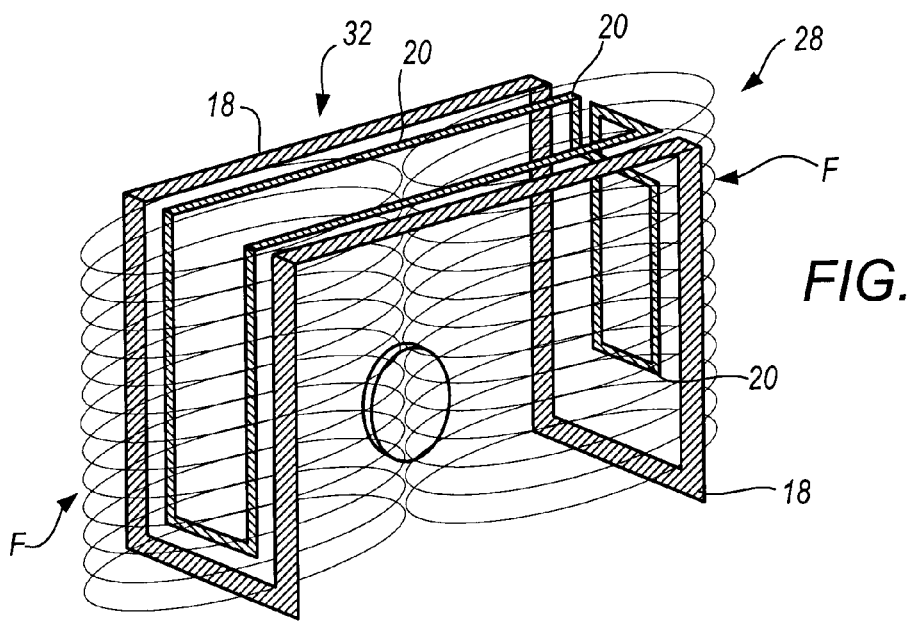
FIG. 5a shows an electromagnetic field generated along the 'Z' axis and a transponder antenna coil in position for optimal detection.

When configured in the folded position, and referring now to FIG. 3, antenna coils 18, 20 are bent in a generally upside down "U" shape, thus 'n', to form a walkthrough having a left side 30, a right side 28 and a top 32 sized to permit passage through the walkway of a steer or other animal having an identification transponder 19 tag attached or embedded thereto. When the antenna is driven by the interrogator unit 25, electromagnetic fields "F" are generated multidirectionally along the Z, Y and X axises as shown in FIGS. 5a, b, c, 6a, b, c, and 7a, b, c, respectively. In the preferred embodiment, the fields are generally mutually perpendicular.

Figure 5B:
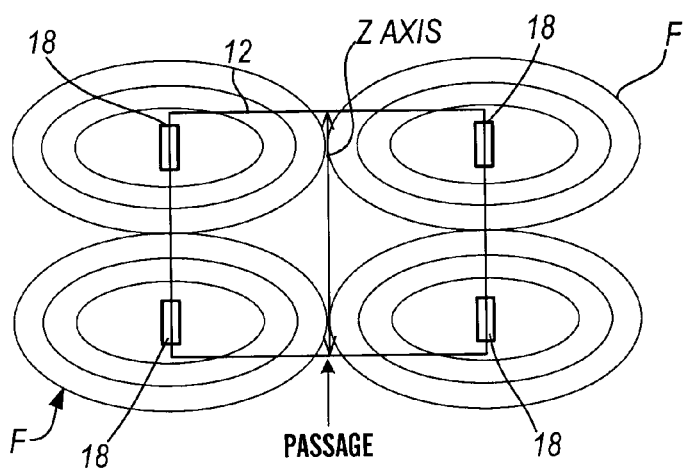
Figure 5C:
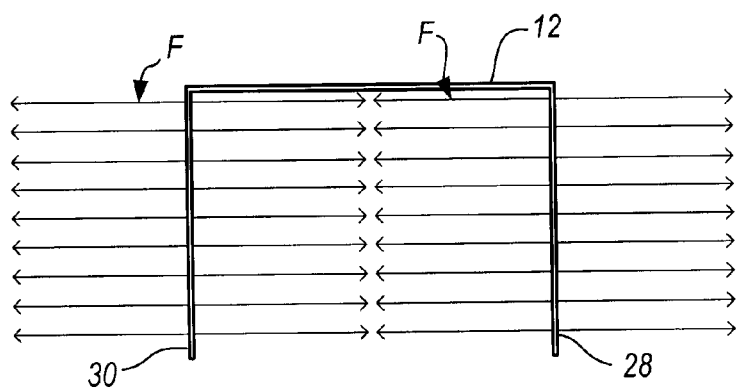

While the outer coil 18 would normally have an electromagnetic field in phase, bending the antenna, as shown in FIG. 3, positions the sides 28, 30 in an opposed relation to each other such that the electromagnetic fields F generated by the antenna coil in sides 28 and 30 in the interior space of the walkthrough become out of phase and a dead zone is potentially created in the center of the walkthrough along the 'Z' axis, i.e., the outer coil 18 of sidewalls 28, 30 create opposed fields along the 'Z' axis, extending inwardly into the walkthrough passage (see FIGS. 5a, 5b and 5c). Magnetic field distribution is maintained in equilibrium, providing full coverage throughout the interior of the passage, by folding the antenna in three equally sized portions. In this way, no dead zone occurs, or its relative size and location, and thereby its potential adverse effect in reading transponders, is minimized.

Figure 4A:
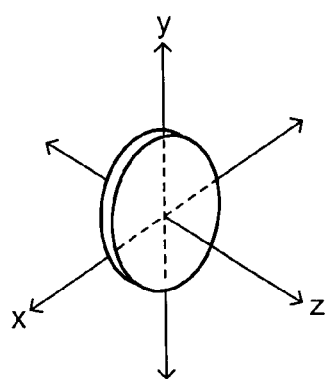
FIG. 4a shows the transponder with its coil antenna oriented in the X–Y plane.

Magnetic fields F are also generated in directions away from the side walls 28,30. If transponder 19 is positioned such that its antenna coil is oriented vertically as shown in FIG. 4a (in the X–Y plane) and passes through the walkthrough along the 'Z' axis, transponder 19 will optimally be read by the electromagnetic field F generated by the segments of outer coil 18 in sidewalls 28, 30 as shown in FIGS. 5a, b and c.

Figure 4B:
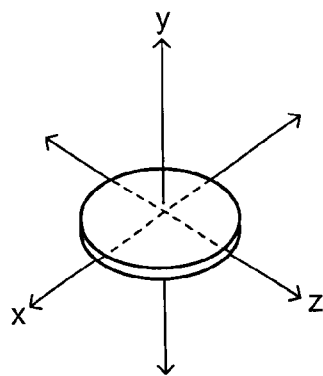
FIG. 4b shows the transponder with its coil antenna oriented in the X–Z plane.
Figure 6A:
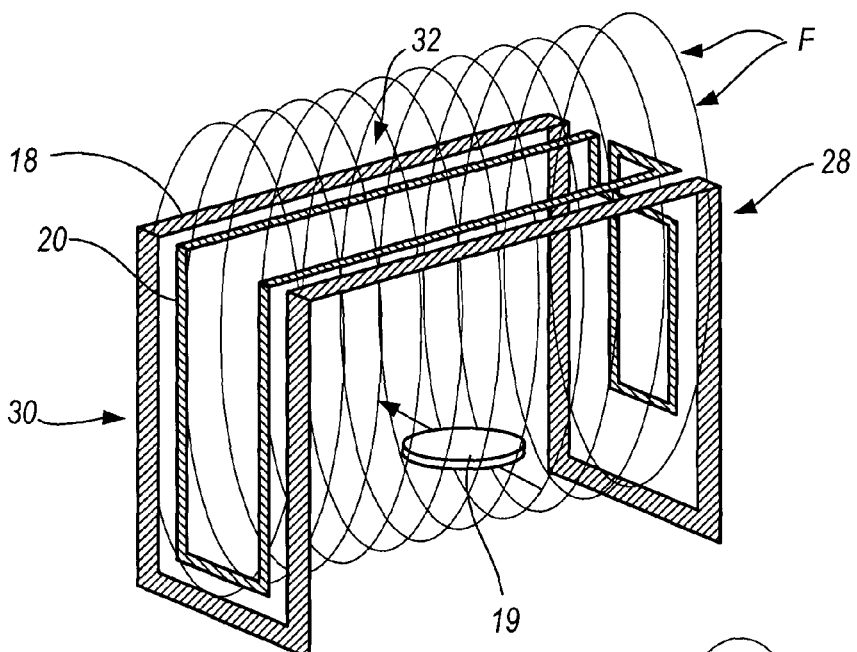
FIG. 6a shows an electromagnetic field generated along the 'Y' axis and a transponder antenna coil in position for optimal detection.
Figure 6B:
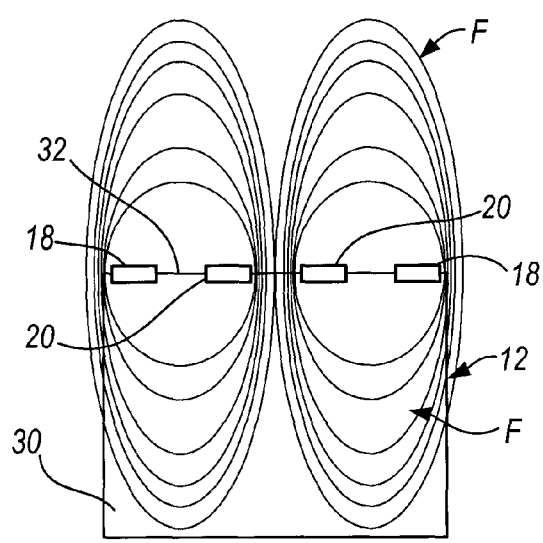
Figure 6C:
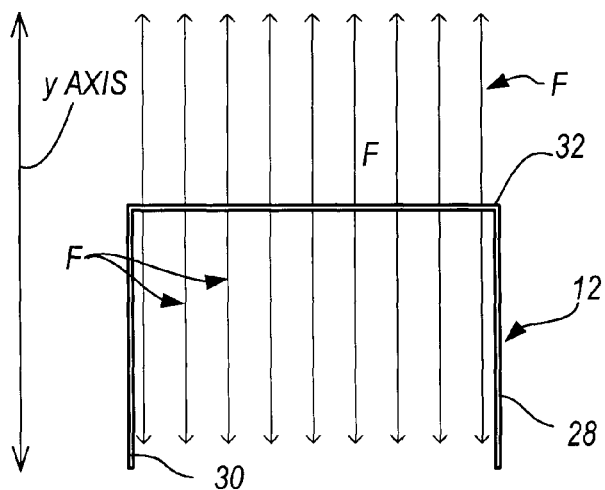

The electromagnetic fields created by the segments of outer and inner antenna coils 18, 20, situated in the top or ceiling segment 32 are in phase and create an electromagnetic field F along the 'Y' axis as shown in FIGS. 6a, 6b and 6c which extends inwardly into the interior space of the walkthrough as well as outwardly above the walkthrough. A transponder 19 passing through the walkthrough antennas 10 and between sidewalls 28, 30 and top panel 32, with the coil of the antenna of transponder 19 oriented parallel to the ground as shown in FIG. 4b (in the X–Z plane), will optimally be read by the electromagnetic field F shown in FIGS. 6a, b and c, generated from the segments of outer coil 18 and inner coil 20 situated in top panel 32.

Figure 4C:
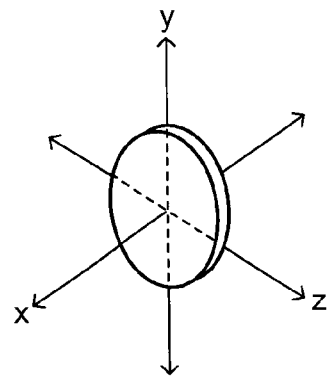
FIG. 4c shows the transponder with its coil antenna oriented in the Y–Z plane.
Figure 7A:
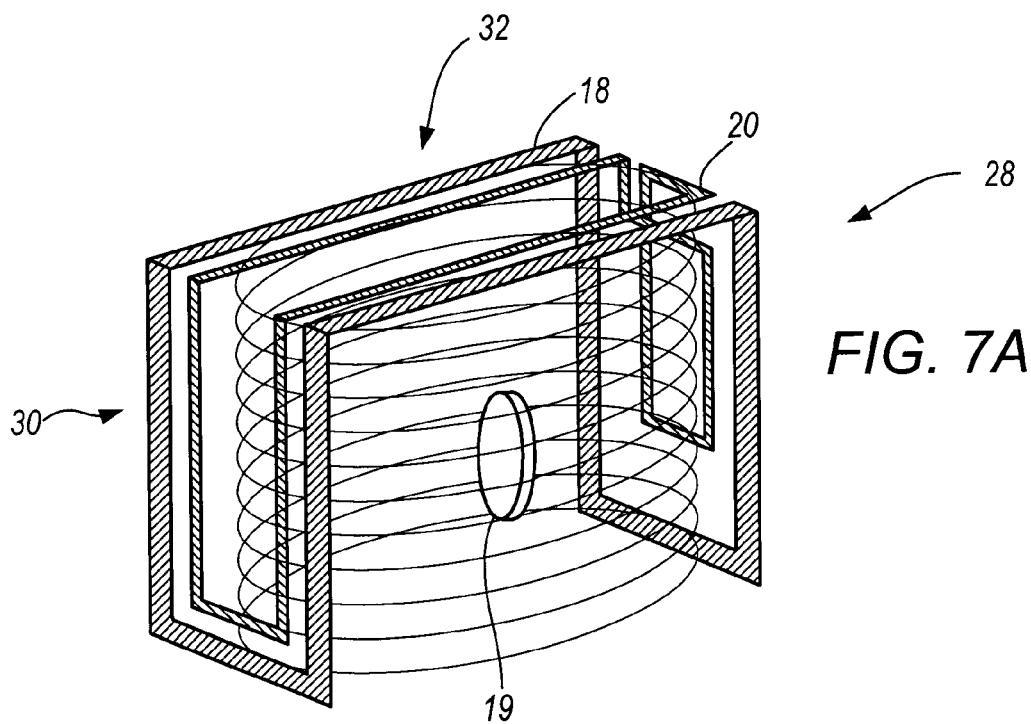
FIG. 7a shows an electromagnetic field generated along the 'X' axis and a transponder antenna coil in position for optimal detection.
Figure 7B:
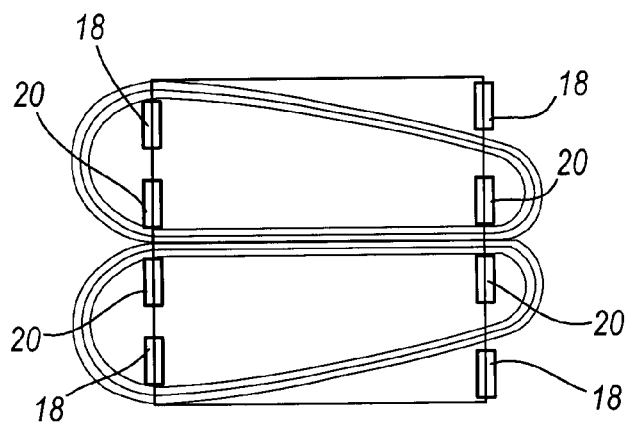
Figure 7C:
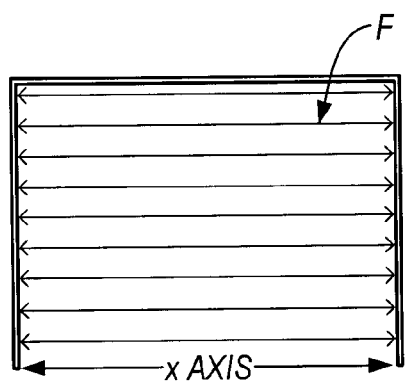
Figure 8:
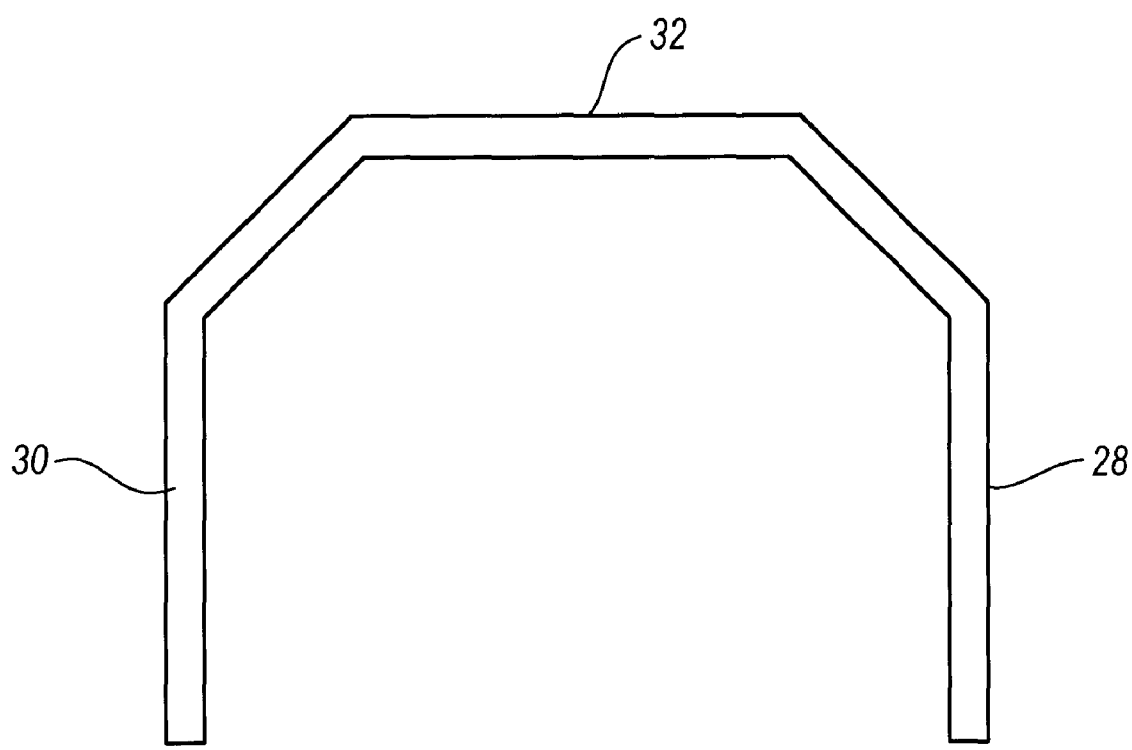
FIG. 8 is an end view of the flexible housing of the antenna of FIG. 2, folded to form a differently shaped walkthrough passage through which the livestock to be identified may pass.

Inner coil 20 on side walls 28, 30 and outer coil 18 on sidewall 30 act to create an electromagnetic field F along the 'X' axis as shown in FIGS. 7a, 7b and 7c, which extends inwardly into the walkthrough and outward of the walkthrough exterior. A transponder 19 passing through the walkthrough antennas 10 and between sidewalls 28,30 and top panel 32, with the antenna coil oriented sideways/vertical as shown in FIGS. 4c and 7a (in the Y–Z plane), will optimally be read by the inner coil 20 segments on the right and left side panels 28, 30 and the outer coil 18 segment of right side panel 30.

Accordingly, the inner and outer coils 20, 18 respectively, on left wall 30 are in phase, and additive while the inner and outer coils 20, 18 respectively, on the right wall 28 are out of phase and subtractive. It can thus be seen that the RFID tag will be optimally read by the electromagnetic fields F that are perpendicular to the orientation of the transponder antenna coil.

As an alternative, the inventors believe that the density of the magnetic field within the passage may be optimized further by utilizing reflective material, such as aluminum foil, as part of the material housing the antenna coils. By utilizing a foil liner, or similar material as part of the material envelope surrounding the antenna coils, with the foil positioned to redirect the magnetic fields generated by the coils into the passageway, it is likely possible to enhance the density of the magnetic fields, thereby likely increasing the ability to detect and read transponders, or it may also allow the antenna to operate satisfactorily, but with less power consumption. For example, and referring to FIG. 2, a foil liner may be added to the inside surface of housing member 12a to direct the magnetic fields of the antenna coils 18, 20 toward the center of the passage.

The flexible aspect of the antenna is designed so that it can be rolled up, moved to a new location, unrolled, put on a makeshift frame to be used for reading the RFID tags of livestock located at geographically different locations. This permits one antenna assembly to replace multiple antennas permanently installed at multiple locations, and eliminates the need to relocate cumbersome and rigid timers among different locations.

Additionally, while the preferred embodiment shows the antenna formed having two sides 28, 30 and a top 32, it will be understood that the flexible aspect of the mat 12 will permit other orientations such as, by way of example and not by way of limitation, the orientation shown in FIG. 5 along with other geometric configurations which maintain the capability for multi-directional electromagnetic field generation. Further, the flexible aspect of the antenna permits it to be sized to accommodate the type of livestock passing through the walkthrough. Regardless of the dimensions or shape of the antenna, however, the inductive "L" and "Q" ratio remain constant by design, thereby maintaining optimum performance.

The above described embodiment depicts the outer and inner antenna coils, 18, 20 of the present antenna coupled in series. It may be, for other implementations, desirable to couple antenna coils, 18, 20 in parallel. However, this will necessitate that the circuit parameters of each of the antenna coils, 18, 20 be matched as the coils thus coupled may have separate and different electrical properties.

It will be understood that the invention may be embodied in other specific forms without departing from the spirit or central characteristics thereof. For example, the inside surface of the outer fabric layer encasing the antenna may include reflective material, such as aluminum foil. It is believed that the addition of this kind of reflective material can enhance the effectiveness of the antenna by increasing the density of the magnetic fields or, alternatively, allowing less power to be used while maintaining effective magnetic fields. The present examples and embodiments are to be considered in all respects as illustrative and not restrictive, and the invention is not intended to be limited to the details given herein.

What is claimed is:

1. An antenna for use with remote interrogator used to detect information specific to each of a plurality of radio frequency transponders attached to livestock, comprising:
   an antenna assembly having an outer antenna coil coupled to an inner antenna coil, said antenna assembly further coupled to said remote sensing/interrogator unit;
   a flexible housing containing said antenna assembly and capable of being positioned to form a passage for permitting livestock having said radio frequency transponders to pass through; and
   said antenna assembly operative to generate multidirectional electromagnetic fields in said passage when excited by said remote sensing/interrogator unit, said generated electromagnetic fields operative to activate and detect information from each of said plurality of radio frequency transponders coming into said generated electromagnetic fields in said passage.

2. The antenna of claim 1, wherein said antenna assembly has an inductance of less than approximately 800 $\mu$H.

3. The antenna of claim 2, wherein said inductance is between about 200–300 $\mu$H.

4. The antenna of claim 1, wherein said outer antenna coil and said inner antenna coil are made of a 16 to 18 gauge wire.

5. The antenna of claim 4, wherein said outer antenna coil contains between 3–5 loops of said 16 to 18 gauge wire.

6. The antenna of claim 4, wherein said inner antenna coil contains between 2–4 loops of said 16 to 18 gauge wire.

7. The antenna of claim 1, wherein said outer antenna coil is a single phase antenna coil.

8. The antenna of claim 1, wherein said inner antenna coil is a double phase antenna coil.

9. The antenna of claim 1, wherein said inner antenna coil is a single phase antenna coil.

10. The antenna of claim 1, wherein said flexible housing is configurable to form a multi-sided passage and said electromagnetic fields are generated in generally mutually perpendicular directions.

11. The antenna of claim 10, wherein said housing is configured to form a three-sided passage and three generally mutually perpendicular magnetic fields are formed.

12. An antenna for use with a radio frequency interrogator in detecting information specific to each of a plurality of animals having a radio frequency transponder associated therewith, comprising:
   an antenna assembly having an outer antenna coil coupled to an inner antenna coil, said antenna assembly further coupled to the interrogator;
   a housing containing said antenna assembly, said housing comprising three generally perpendicular sides of a passage for permitting animals having said radio frequency transponders to pass through; and,
   said antenna assembly operative to generate multidirectional electromagnetic fields in said passage when excited by said interrogator, said generated electromagnetic fields operative to activate and detect information from each of the plurality of radio frequency transponders coming into said generated electromagnetic fields in said passage.

13. The antenna of claim 12, wherein three generally mutually perpendicular magnetic fields are generated within the interior of said passage.

14. The antenna of claim 12, wherein said antenna assembly has an inductance of approximately 800 $\mu$H or less.

15. An antenna for use with a radio frequency interrogator in detecting information specific to each of a plurality of animals having a radio frequency transponder associated therewith, comprising:
   an antenna assembly having an outer antenna coil coupled to an inner antenna coil, said antenna assembly further coupled to the interrogator;
   said antenna assembly operative to generate multidirectional electromagnetic fields in a localized area when excited by said interrogator, said generated electromagnetic fields operative to activate and detect information from each of the plurality of radio frequency transponders coming into said generated electromagnetic fields; and
   a housing containing said antenna assembly and capable of being positioned to form a passage for permitting animals having radio frequency transponders associated therewith to pass through.

16. The antenna of claim 15, wherein said multidirectional electromagnetic fields comprise at least three mutually generally perpendicular magnetic fields.

17. The antenna of claim 15, wherein said housing is a flexible housing allowing said antenna to assume different configurations.

18. The antenna of claim 17, wherein said antenna and housing are configured to form a passage for permitting animals having radio frequency transponders to pass.

19. The antenna of claim 18, wherein said configuration is a three sided passage.

20. The antenna of claim 15, wherein said antenna assembly has an inductance of less than approximately 800 $\mu$H.

21. The antenna of claim 20, wherein said inductance is between about 200–300 $\mu$H.

22. The antenna of claim 15, wherein said outer antenna coil and said inner antenna coil are made of a 16 to 18 gauge wire.

23. The antenna of claim 22, wherein said outer antenna coil contains between 3–5 loops of said 16 to 18 gauge wire.

24. The antenna of claim 22, wherein said inner antenna coil contains between 2–4 loops of said 16 to 18 gauge wire.

25. An antenna for use with a radio frequency interrogator in detecting information associated with each of a plurality of objects having a radio frequency transponder associated therewith, comprising:

an outer antenna coil adapted to be coupled to the interrogator;

an inner antenna coil coupled to said outer antenna coil and adapted to be coupled to the interrogator, said inner antenna coil arranged to be located in a plane which is substantially parallel to the plane of said outer antenna coil, wherein said inner antenna coil and said outer antenna coil do not overlap each other; and a housing containing said inner and outer antenna coils, said housing comprising three generally perpendicular sides of a passage for permitting objects having said radio frequency transponders to pass through;

wherein said antenna coils are operative to be excited by the interrogator to generate multidirectional electromagnetic fields operative to activate and to detect information from each of the plurality of radio frequency transponders coming into said electromagnetic fields irrespective of the relative orientation of said radio frequency transponders relative to said housing.

26. The antenna of claim 25, wherein said multidirectional electromagnetic fields comprise at least three mutually generally perpendicular magnetic fields.

27. The antenna of claim 25, wherein said housing is a flexible housing allowing said antenna to assume different configurations.

28. The antenna of claim 27, wherein said antenna and housing are configured to form a passage for permitting animals having radio frequency transponders to pass through.

29. The antenna of claim 25, wherein said antenna assembly has an inductance of less than approximately 800 $\mu$H.

30. The antenna of claim 29, wherein said inductance is between about 200–300 $\mu$H.

31. The antenna of claim 25, wherein said outer antenna coil and said inner antenna coil are made of a 16 to 18 gauge wire.

32. The antenna of claim 31, wherein said outer antenna coil contains between 3–5 loops of said 16 to 18 gauge wire.

33. The antenna of claim 31, wherein said inner antenna coil contains between 2–4 loops of said 16 to 18 gauge wire.

34. An antenna for use with a radio frequency interrogator in detecting information specific to each of a plurality of objects having a radio frequency transponder associated therewith, comprising:

an antenna assembly having an outer antenna coil forming a loop coupled to an inner antenna coil positioned inside of said loop of said outer coil, said inner and outer coils positioned in substantially the same plane, and said antenna assembly further coupled to the interrogator;

said antenna assembly operative to generate multidirectional electromagnetic fields in a localized area when excited by said interrogator, said generated electromagnetic fields operative to activate and detect information from each of the plurality of radio frequency transponders coming into said generated electromagnetic fields; and a housing containing said antenna assembly and capable of being positioned to form a passage for permitting the objects having radio frequency transponders associated therewith to pass through.

* * * * *